March 24, 1936.  E. R. FITCH  2,035,059
TRIPLE VALVE DEVICE
Filed Dec. 28, 1934
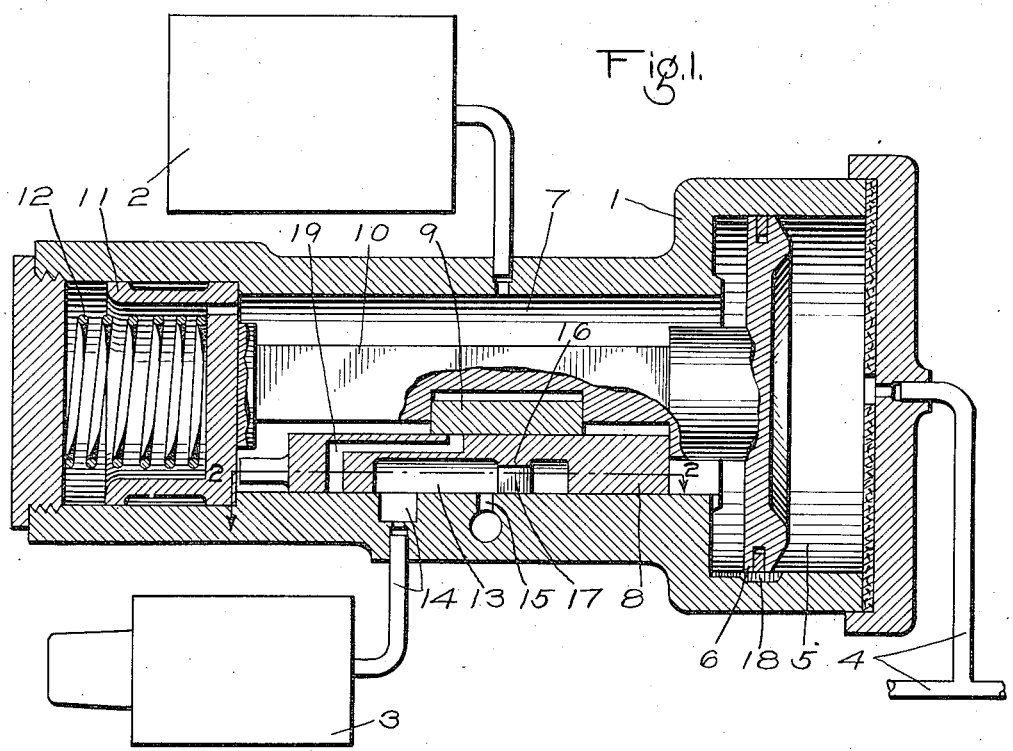
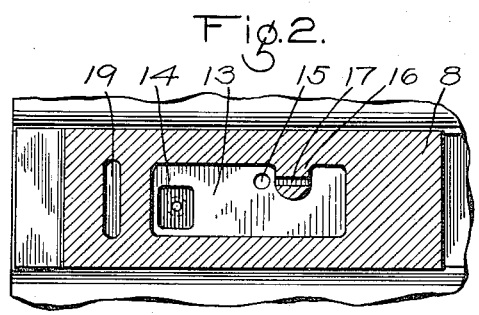
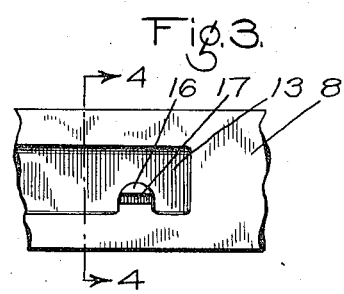
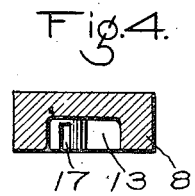
INVENTOR
ELLERY R. FITCH
BY *Wm. M. Cady*
ATTORNEY Patented Mar. 24, 1936

2,035,059

UNITED STATES PATENT OFFICE 2,035,059

TRIPLE VALVE DEVICE

Ellery R. Fitch, Edgewood, Pa., assignor to The Westinghouse Air Brake Company, Wilmerding, Pa., a corporation of Pennsylvania Application December 28, 1934, Serial No. 759,446

9 Claims. (Cl. 303—36)

This invention relates to fluid pressure brakes and more particularly to a triple valve device having means for retarding the release of the brakes at the head end of a train, in order to secure a more uniform release of the brakes throughout the train.

The principal object of the invention is to provide, in a triple valve device having a normal release position and an inner retarded release position, means for effecting a substantially uniform retarded rate of release of brake cylinder pressure in the retarded release position, regardless of slight variations due, for instance, to manufacturing tolerances, in the registration of the ports which control the release of brake cylinder pressure.

Another object of the invention is to provide, in a triple valve device of the retarded release type, a simplified construction whereby the slide valve establishes a restricted communication through which fluid is released from the brake cylinder in retarded release position of the triple valve device.

A still further object of the invention is to provide a slide valve for a valve device adapted to control the flow of fluid under pressure having a restricted passageway which is self-cleaning, so as to prevent the clogging of same with foreign matter which may be present in the fluid flowing therethrough.

In the accompanying drawing, Fig. 1 is a diagrammatic view of a car brake equipment including a triple valve device of the retarded release type shown in section, and embodying my invention, the parts being shown in full release position; Fig. 2 is a sectional view taken on the line 2—2 of Fig. 1; Fig. 3 is a face view of a portion of the main slide valve of the triple valve device; and Fig. 4 is a sectional view taken on the line 4—4 of Fig. 3.

As shown in Fig. 1, the car fluid pressure brake equipment comprises a triple valve device 1, an auxiliary reservoir 2, a brake cylinder 3, and a brake pipe 4.

For the sake of simplicity, the triple valve device 1 is shown in Fig. 1 in elemental form, comprising a casing having a piston chamber 5 connected to the brake pipe 4 and containing a piston 6. The valve chamber 7 at the opposite side of the piston 6 is connected to the auxiliary reservoir 2 and contains a main slide valve 8 and a graduating slide valve 9, adapted to be operated, through a piston stem 10, by piston 6.

The triple valve device, being of the retarded release type, is provided with a retarded release stop member 11, the inner movement of which is opposed by a spring 12. The member 11 is adapted to oppose inward movement of the piston stem 10 and the main slide valve 8 from normal release position to retarded release position.

The main slide valve 8 is provided with the usual exhaust cavity 13 which is adapted to register with a passage 14 leading to the brake cylinder 3 and with the usual triple valve exhaust passage 15 in normal release position, and to register only with the passage 14 in retarded release position.

The main slide valve 8 is provided with a lug 16 extending into the exhaust cavity 13 from one side wall thereof and intermediate the ends of the cavity, said lug having a seating face disposed in the plane of the seating face of the slide valve, so as to slidably engage the main slide valve seat in the casing. The seating face of the lug is substantially larger than the port opening into passage 15 and is so disposed that when the main slide valve is in retarded release position, the central portion of said seating face overlies said port.

Extending across the full seating face of the lug 16, longitudinally of the slide valve, is a slot 17, which is open at its opposite ends, to the exhaust cavity 13 and which forms a fluid pressure passage adapted to extend across the triple valve exhaust passage 15 in the main slide valve seat in retarded release position, the width of said slot, at the seat face, being less than the width of the exhaust passage 15, transversely of the direction of motion of the slide valve, so that said passage is partially lapped when the triple valve device is in retarded release position. The depth of the slot is such that the flow capacity thereof is substantially greater than the flow capacity of the opening formed at the junction of said slot and said passage 15, and therefore said opening controls the rate of release of brake cylinder pressure in retarded release position, as will be understood from the description hereinafter. With the flow capacity of the slot substantially greater than the flow capacity of said opening, it will be seen that ordinary wear of the seat face of the main slide valve 8 will not cause the depth of the slot to be reduced sufficiently to reduce the flow capacity of the slot to that of the opening formed at the junction of said slot and passage 15.

In operation, fluid under pressure supplied to the brake pipe 4 in the usual manner flows therefrom to the piston chamber 5. With the triple valve parts in normal release position, as shown in Fig. 1, fluid under pressure flows from said piston chamber through a feed groove 18 to valve chamber 7 and from thence to the auxiliary reservoir 2, thereby charging said chamber and reservoir to brake pipe pressure. With the main slide valve 8 in normal release position, the exhaust cavity 13 registers with the passage 14 and with the triple valve exhaust passage 15, so that the brake cylinder 3 is vented through passage 14 and pipe 14, exhaust cavity 13, and the triple valve exhaust passage 15.

To effect an application of the brakes, a reduction in brake pipe pressure is effected in the usual manner, and fluid under pressure is then vented from the piston chamber 5. The pressure of the fluid in valve chamber 7 moves the piston 6 outwardly, first closing off communication through the feed groove 18 and moving the graduating slide valve 9 relative to the main valve 8, so that the usual service port 19 in the main slide valve is uncovered. The movement of the piston 6, and consequently of the main slide valve 8, continues until these parts are in application position, in which the service port 19 registers with the brake cylinder passage 14, for supplying fluid under pressure from the slide valve chamber 7, and connected auxiliary reservoir 2, to the brake cylinder 3.

In order to effect a release of the brakes after an application, the pressure in the brake pipe 4, and thereby in piston chamber 5, is increased in the usual manner. On cars at the head end of the train, where the increase in brake pipe pressure is rapid, the triple valve piston 6 is moved to retarded release position, in which exhaust cavity 13 registers with the brake cylinder passage 14, while the slot 17 registers with the exhaust passage 15. Fluid is then released from the brake cylinder 3 at a restricted rate through passage 14, the exhaust cavity 13, slot 17, and the triple valve exhaust passage 15, the rate of release being controlled by the restricted opening formed at the junction of the slot 17 and passage 15.

When effecting a release of brakes on cars at the rear of the train, the triple valve piston 6 is moved only to normal release position, in which the exhaust cavity 13 directly connects the brake cylinder passage 14 with the exhaust passage 15, so that fluid is released from the brake cylinder on those cars at a more rapid rate than on cars at the head end of the train.

It will be seen from the foregoing that my invention provides a simplified construction, whereby a restricted communication is established by the slide valve through which fluid is released from the brake cylinder in retarded release position of the triple valve device. Also, due to my improved construction, variations due to manufacturing tolerances, which would tend to affect port registration, do not affect the registration of the slot 17 and the exhaust passage 15, and thus a uniform rate of release of brake cylinder pressure in retarded release position of the triple valve device is insured.

It will be understood that the slot 17 being open at both ends to the exhaust cavity 13, fluid under pressure flows, in retarded release position, from said cavity through both ends of the slot. Due to this feature, the tendency for foreign matter carried by the fluid under pressure to accumulate in the slot and ultimately restrict the flow of fluid under pressure therethrough is reduced. Moreover, any scale which may be carried against the end of the slot by fluid under pressure will tend to ultimately lodge on the slide valve seat, where it will be subject to the scraping action of the slide valve sliding on its seat and this will tend to prevent the scale from clogging the slot.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, the combination with a casing having a slide valve seat and a port in said seat, of a slide valve having a seating face in sliding engagement with said seat, said seating face being provided with a slot adapted to register with said port in one position of said slide valve and being out of registration with said port in another position of said slide valve, the cross-sectional area of the portion of said slot in registration with said port being less than the cross-sectional area of said port, for restricting the flow of fluid through said port.

2. In a fluid pressure brake, the combination with a casing having a slide valve seat and a port in said seat, of a slide valve having a seating face in sliding engagement with said seat, said seating face being provided with a slot extending across said seating face in the direction of movement of said slide valve and adapted to register with said port in one position of said slide valve and being out of registry with said port in another position of said slide valve, the cross-sectional area of the portion of said slot in registration with said port being less than the cross-sectional area of said port, for restricting the flow of fluid through said port.

3. In a fluid pressure brake, the combination with a casing having a slide valve seat and a port in said seat, of a slide valve having a seating face in sliding engagement with said seat, said seating face being provided with a slot adapted to register with said port in one position of said slide valve and being out of registry with said port in another position of said slide valve, the width of said slot being less than that of said port so as to restrict the flow of fluid through said port and the depth of said slot being such that the flow capacity through said slot, from one side to the other, exceeds the flow capacity through said slot to said port.

4. In a fluid pressure brake, the combination with a casing having a slide valve seat provided with two ports, of a slide valve mounted on said seat and having a cavity and being provided with an extension within said cavity having a seating face adapted to slidably engage said seat, said seating face being provided with a slot open to said cavity, said slide valve having one position in which said cavity registers with said ports for establishing a communication through which fluid flows at a relatively fast rate, and having another position in which said cavity registers with one of said ports and said slot registers with the other of said ports, the cross-sectional area of the portion of said slot in registration with said port being less than the cross-sectional area of said port, for restricting the flow of fluid through said port.

5. In a fluid pressure brake, the combination with a brake cylinder, of a triple valve device including a slide valve movable to a release position and having an exhaust cavity and a seat having a brake cylinder port and an exhaust port, said slide valve having a portion within said cavity which seats on said seat and which is provided with a slot opening into said cavity, said cavity registering with said brake cylinder port in said release position and said slot registering with said exhaust port, the cross-sectional area of the portion of said slot in registration with said exhaust port being less than the cross-sectional area of said exhaust port, for restricting the flow of fluid through said port.

6. In a fluid pressure brake, the combination with a brake cylinder, of a triple valve device including a slide valve movable to two release positions and having an exhaust cavity and a seat having a brake cylinder port and an exhaust port, said slide valve having a portion within said cavity which seats on said seat and which is provided with a slot opening into said cavity, said cavity registering with said ports in one release position, and said slot registering with said exhaust port while said cavity registers with said brake cylinder port in the other release position, the cross-sectional area of the portion of said slot in registration with said exhaust port being less than the cross-sectional area of said exhaust port, for restricting the flow of fluid through said exhaust port.

7. In a fluid pressure brake, the combination with a brake cylinder, of a triple valve device including a slide valve movable to two release positions and having an exhaust cavity and a seat having a brake cylinder port and an exhaust port, said slide valve having a portion within said cavity which seats on said seat and which is provided with a slot extending in the direction of movement of said slide valve and opening at opposite sides into said cavity, said cavity registering with said ports in one release position, and said slot registering with said exhaust port while said cavity registers with said brake cylinder port in the other release position, the cross-sectional area of the portion of said slot in registration with said exhaust port being less than the cross-sectional area of said exhaust port, for restricting the flow of fluid through said exhaust port.

8. In a fluid pressure brake, in combination, a brake pipe, a casing having a slide valve seat and a port in said seat, the slide valve having a seating face in sliding engagement with said seat, the seating face of the slide valve being provided with a cavity adapted to register with said port in one position of said slide valve, and having a portion in said cavity which seats on said seat and which is adapted in another position of the slide valve to cover the port, said portion being provided with a slot adapted to register with said port, the cross-sectional area of the slot in registration with said port being less than the cross-sectional area of the port, and means operated by an increase in brake pipe pressure at one rate for moving the slide valve to the position in which the cavity registers with the port in the slide valve, and operated by an increase in brake pipe pressure at a greater rate for moving the slide valve to the position in which the slot registers with the port in said valve seat, whereby the flow of fluid through said port is restricted.

9. In a fluid pressure brake, in combination, a brake pipe, a casing having a slide valve seat and a port in said seat, the slide valve having a seating face in sliding engagement with said seat, the seating face of the slide valve being provided with a cavity adapted to register with said port in one position of said slide valve, and having a portion in said cavity which seats on said seat and which is adapted in another position of the slide valve to cover the port, said portion being provided with a slot extending in the direction of movement of the slide valve and adapted to register with said port, the cross-sectional area of the slot in registration with said port being less than the cross-sectional area of the port, and means operated by an increase in brake pipe pressure at one rate for moving the slide valve to the position in which the cavity registers with the port in the slide valve, and operated by an increase in brake pipe pressure at a greater rate for moving the slide valve to the position in which the slot registers with the port in said valve seat, whereby the flow of fluid through said port is restricted.

ELLERY R. FITCH.